(12) United States Patent
Genz

(10) Patent No.: US 7,383,916 B2
(45) Date of Patent: Jun. 10, 2008

(54) ALL WHEEL STEERING WITH TORQUE SHAFT LINKAGE

(75) Inventor: Thomas Russell Genz, Horicon, WI (US)

(73) Assignee: Deere & Company, Moline, IL (US)

( * ) Notice: Subject to any disclaimer, the term of this patent is extended or adjusted under 35 U.S.C. 154(b) by 457 days.

(21) Appl. No.: 11/038,729

(22) Filed: Jan. 20, 2005

(65) Prior Publication Data

US 2006/0157948 A1 Jul. 20, 2006

(51) Int. Cl.
*B62D 5/06* (2006.01)

(52) U.S. Cl. ............... 180/408; 180/409; 280/91.1; 280/99

(58) Field of Classification Search ........... 180/408, 180/409, 411; 280/91.1, 99, 100
See application file for complete search history.

(56) References Cited

U.S. PATENT DOCUMENTS

| 868,337 | A | | 10/1907 | Geist | |
|---|---|---|---|---|---|
| 1,228,980 | A | | 6/1917 | Smith | |
| 1,599,262 | A | | 9/1926 | Withell | |
| 1,821,063 | A | | 9/1931 | Knight | |
| 1,830,552 | A | | 11/1931 | Liimatta | |
| 2,234,888 | A | | 3/1941 | Blagden | |
| 4,295,657 | A | | 10/1981 | Sano et al. | 280/91 |
| 4,441,735 | A | | 4/1984 | Hutchison et al. | 280/771 |
| 4,483,547 | A | | 11/1984 | Furukawa et al. | 280/91 |
| 4,553,768 | A | | 11/1985 | Furukawa et al. | 280/91 |
| 4,586,722 | A | | 5/1986 | Watanabe et al. | 280/103 |
| 4,657,102 | A | | 4/1987 | Kanazawa et al. | 180/140 |
| 4,721,318 | A | | 1/1988 | Hase et al. | 280/91 |
| 4,738,459 | A | * | 4/1988 | Nakamura et al. | 180/409 |
| 4,881,613 | A | | 11/1989 | Kanazawa et al. | 180/140 |
| 4,957,183 | A | | 9/1990 | Mullett et al. | 180/234 |
| 4,977,733 | A | | 12/1990 | Samejima et al. | 56/14.7 |
| 5,020,812 | A | | 6/1991 | Sugiyama | 280/91 |
| 5,048,853 | A | * | 9/1991 | Trefz et al. | 180/411 |
| 5,076,597 | A | | 12/1991 | Korekane et al. | 280/91 |
| 5,090,512 | A | | 2/1992 | Mullet et al. | 180/236 |
| 5,174,595 | A | | 12/1992 | Snipes | 280/91 |
| 5,186,273 | A | | 2/1993 | Mori | 180/140 |
| 5,288,091 | A | | 2/1994 | Deschamps | 280/91 |
| 5,295,553 | A | | 3/1994 | Morita et al. | 180/212 |
| 5,531,466 | A | * | 7/1996 | Hayashi | 280/91.1 |
| 5,533,584 | A | | 7/1996 | Johnson | 180/415 |
| 6,131,689 | A | * | 10/2000 | Nodorft et al. | 180/409 |
| 6,619,680 | B2 | * | 9/2003 | Platteeuw et al. | 280/100 |
| 6,684,974 | B1 | * | 2/2004 | Ulschmid | 180/414 |

FOREIGN PATENT DOCUMENTS

JP 62 181960 10/1987

OTHER PUBLICATIONS

Bobcat A300 All-Wheel Steer Loader Brochure.

* cited by examiner

*Primary Examiner*—Toan C. To

(57) ABSTRACT

The entire right, title and interest in and to this application and all subject matter disclosed and/or claimed therein, including any and all divisions, continuations, reissues, etc., thereof are, effective as of the date of execution of this application, assigned, transferred, sold and set over by the applicant(s) named herein to Deere & Company, a Delaware corporation having offices at Moline, Ill. 61265, U.S.A., together with all rights to file, and to claim priorities in connection with, corresponding patent applications in any and all foreign countries in the name of Deere & Company or otherwise.

19 Claims, 6 Drawing Sheets

ALL WHEEL STEERING WITH TORQUE SHAFT LINKAGE

FIELD OF THE INVENTION

This invention relates generally to vehicles having all wheel steering, and more specifically to lawn and garden tractors and other similar off-road vehicles having all wheel steering.

BACKGROUND OF THE INVENTION

Lawn and garden tractors and other utility vehicles may include all-wheel steering mechanisms which serve to turn all four ground engaging wheels. This provides the capability of executing relatively tight, small radius turns. For example, a tight turning radius may be desirable when using a lawn tractor to mow close around obstacles such as trees, posts or similar obstructions.

All-wheel steering mechanisms typically include an arm that translates or shifts forward or backward as the steering shaft pivots in response to the steering wheel being turned. Examples of all-wheel steering systems are shown in U.S. Pat. Nos. 5,174,595, 6,131,689 and 6,684,974 assigned to Deere and Company of Moline, Ill. U.S. Pat. No. 5,174,595 entitled "Four Wheel Steering Mechanism" relates to a steering linkage extending along the left side of the vehicle, which includes front and rear rod members that pivot, and an intermediate rod member that shifts longitudinally, as well as slightly laterally and vertically. U.S. Pat. No. 6,131,689 entitled "All-Wheel-Steer Biasing Mechanism" relates to a steering linkage having a front link element and a rear link element, both of which shift fore or aft to turn the front and rear wheels, and a biasing mechanism for biasing the rear wheel steering linkage back to a position for straight forward travel. U.S. Pat. No. 6,684,974 entitled "Four-Wheel Steering System for Utility Vehicle" relates to a linkage assembly that transforms pivoting motion of the front steering arms to pivoting motion of the rear steering arms, and eliminates the need for a front center-pivot.

All wheel steering systems are relatively costly and complex to manufacture and assemble, and may require many more parts and components than two wheel steering systems. There is a need to reduce the cost, complexity and number of parts and components in an all wheel steering system.

All wheel steering systems also require considerable space under the vehicle frame for link elements that translate or shift forward or backward when executing a turn. For example, drag links and bell cranks in an all wheel steering system may transmit motion for turning the front and rear wheels, and consume space under the frame that may be desirable for other parts and/or functions. There is a need to reduce the space requirements for an all wheel steering system.

In the past, all wheel steering systems also may not offer an equal turning radius in both directions. For example, the arm and/or link rods may not swing forward as far as backward. There is a need for an all wheel steering system that provides a more equal turning radius in both directions.

SUMMARY OF THE INVENTION

An all wheel steering system for a utility vehicle includes a torque shaft between pairs of steerable front and rear wheels. The torque shaft pivots on a longitudinal axis parallel to the longitudinal axis of the vehicle. A front crank may be secured to the torque shaft adjacent its forward end, and left and right rear cranks may be secured to the torque shaft adjacent its rearward end. The torque shaft transmits rotation from the front crank to the left and right rear cranks when the steering wheel is turned to steer the pairs of front and rear wheels.

The all wheel steering system with torque shaft may be operated manually or hydraulically assisted. The torque shaft reduces or minimizes the space requirements for an all wheel steering linkage between the front and rear pairs of wheels.

DESCRIPTION OF THE PREFERRED EMBODIMENT

Figure 1:
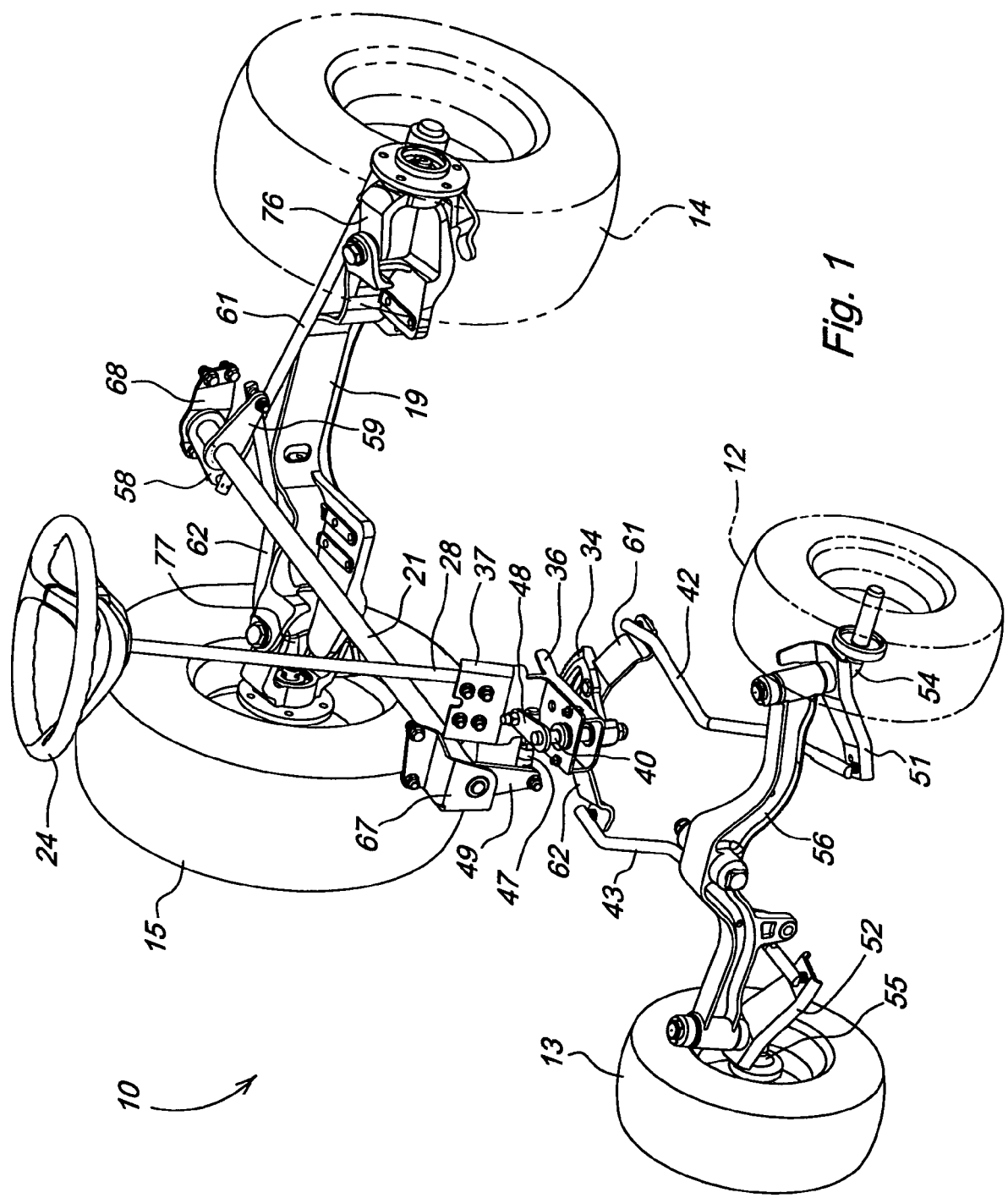
FIG. 1 is a perspective view of the all wheel steering system with torque shaft linkage according to a first embodiment of the invention.
Figure 2:
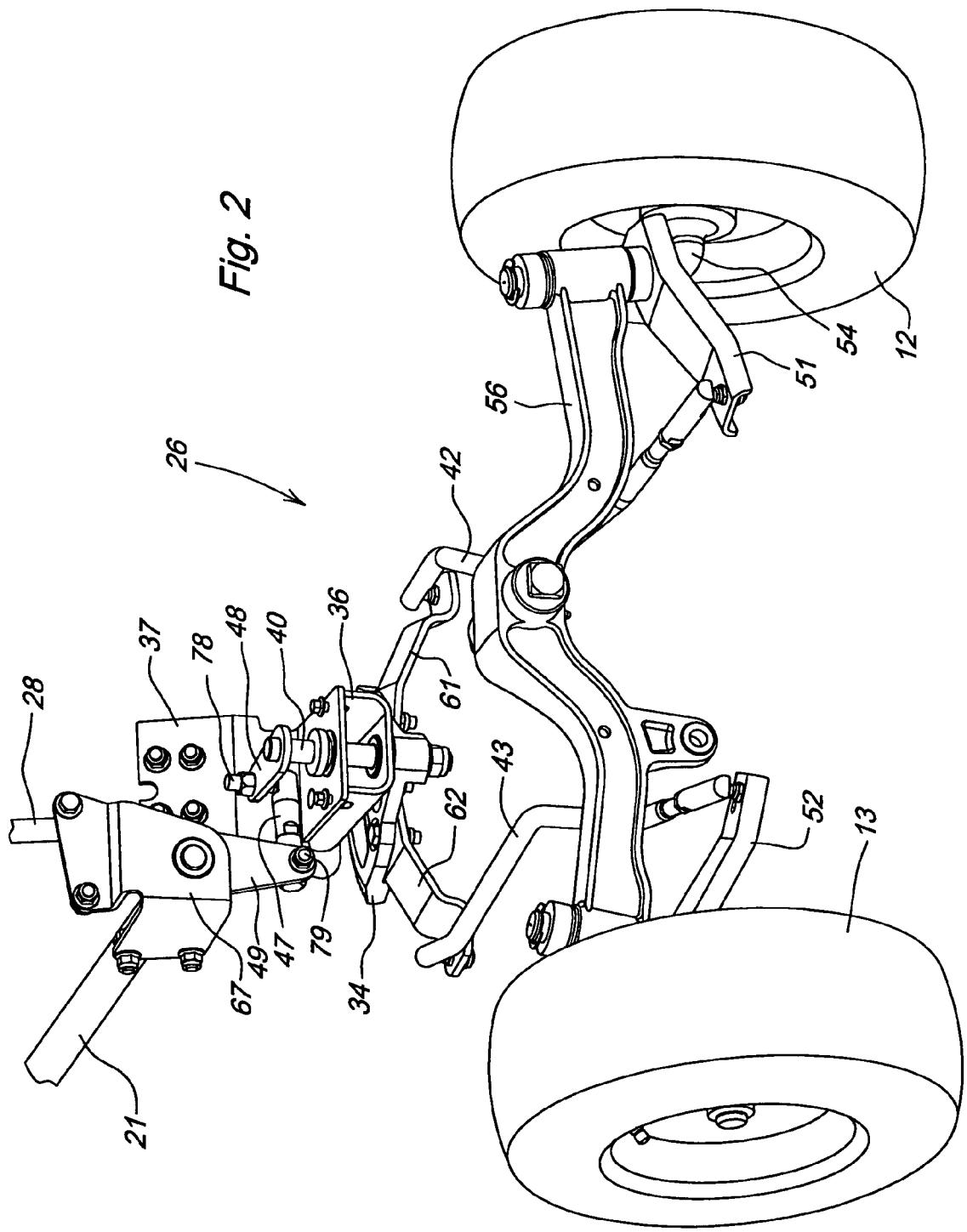
FIG. 2 is a perspective view of the front steering linkage according to the first embodiment.
Figure 3:
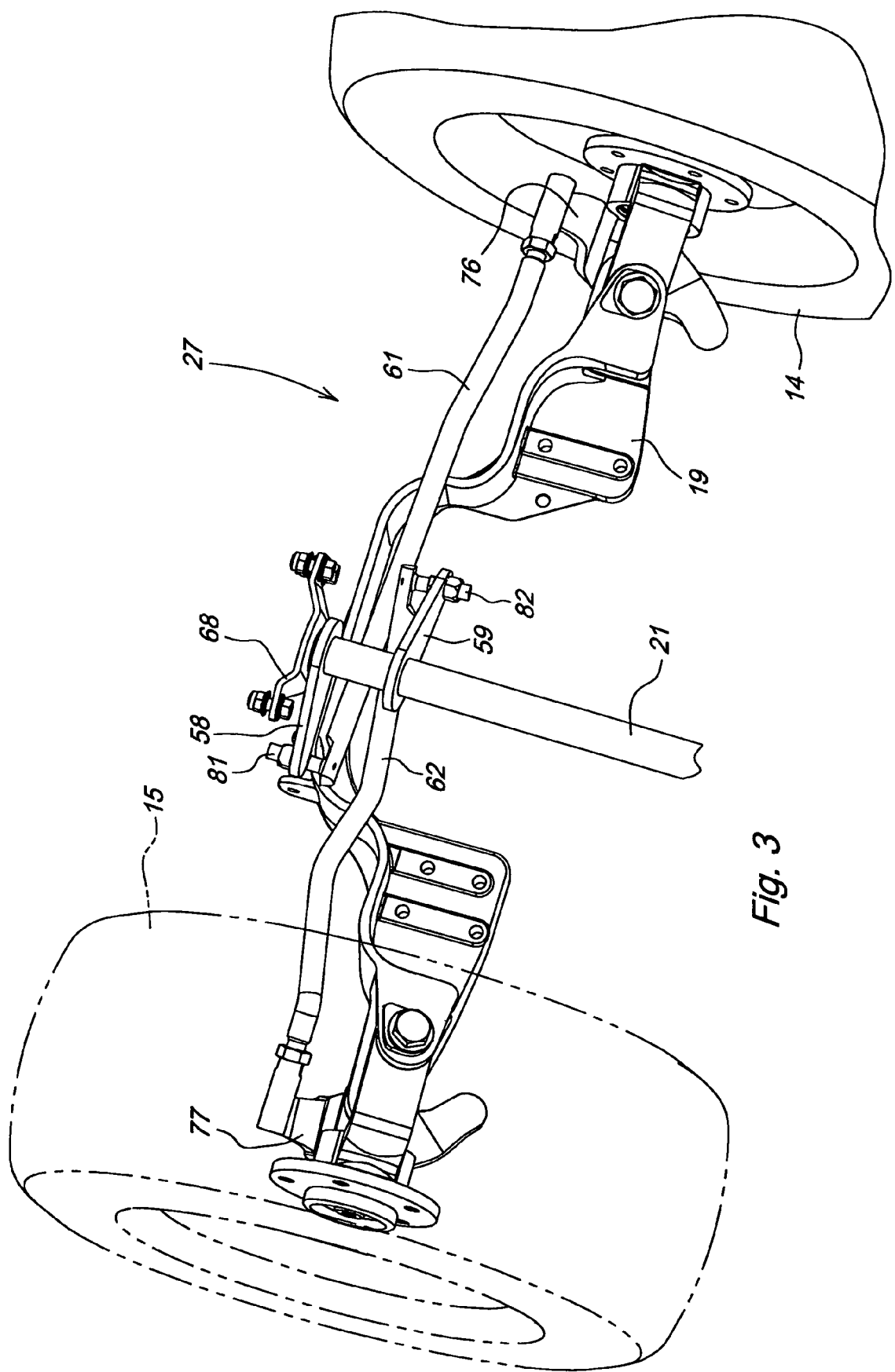
FIG. 3 is a perspective view of the rear steering linkage according to the first embodiment.

Referring now to FIGS. 1-3, a first embodiment of the present invention is shown. Lawn tractor or other utility vehicle 10 includes a pair of front wheels 12, 13 and a pair of rear wheels 14, 15. The rear wheels may be driven by an engine supported at the front of the vehicle. Steering wheel 24 may be mounted in an operator station in conventional fashion such that a seated operator can steer the vehicle by turning the steering wheel.

One embodiment of front steering linkage 26 will be described in greater detail. Steering shaft 28 may be coupled to and extend downwardly from steering wheel 24. At the lower end of steering shaft 28 is a pinion gear in mesh with sector gear 34. The sector gear may be pivotably supported by first support plate 36 which may be bolted or otherwise affixed to second support plate 37. The first and/or second support plates may be bolted or secured to the tractor frame. A first end of sector pin 40 may be fixed with the sector gear and may define a first axis about which sector gear 34 pivots. Sector pin 40 may extend through openings in first support plate 36 and second support plate 37.

In one embodiment, pivot pin crank 48 may be securely fixed by welds or other means at or near a second end of sector pin 40. Pivot pin crank 48 may pivot along with sector pin 40 on a first generally vertical axis defined by the sector pin. Rod 47 may provide a link between pivot pin crank 48 and front crank 49, and may be pivotably connected to cranks 48, 49 with threaded or other pivotable fasteners. Rod 47 may connect cranks 48, 49 such that pivotal movement of pivot pin crank 48 on the first generally vertical axis may be translated to pivotal movement of front crank 49 on a second generally horizontal axis transverse to the first axis. The second generally horizontal axis may be parallel to the longitudinal axis of the vehicle.

In one embodiment, left and right sector arms 61, 62 may be attached and secured to the opposing ends of sector gear 34 with bolts or other fasteners. Left and right front tie rods 42, 43 may pivotably attach left and right sector arms 61, 62 to left and right front steering arms 51, 52 respectively. Left and right front steering arms 51, 52 may be operatively fixed with left and right front wheel support assemblies or spindles 54, 55 for pivoting the left and right front wheels 12, 13 during execution of a vehicle turn. The front wheel support assemblies or spindles 54, 55 may be mounted to front axle 56. In one embodiment, as the operator turns steering wheel 24, steering shaft 28 causes sector gear 34 to pivot about the first axis defined by sector pin 40. As a result, sector arms 61, 62 mounted to sector gear 34 also pivot, causing front tie rods 42, 43 to turn front steering arms 51, 52.

In one embodiment, front crank 49 pivots on a second axis that may be parallel to the longitudinal axis of the vehicle. The second axis may be defined by torque shaft 21. Torque shaft 21 may be an aluminum or steel bar or tube having an outer thickness or diameter of between about ½ inch and about 2 inches. The torque shaft may be positioned in the vehicle above the front axle center line and the rear axle center line.

In one embodiment, front crank 49 may be fixed by welds or other secure attachment to torque shaft 21 at or near the forward end of the torque shaft. Left and right rear cranks 58, 59 may be fixed by welds of other secure attachment to torque shaft 21 at or near the rearward end of the torque shaft. The forward end of torque shaft 21 may be supported for pivotal rotation by plate or bracket 67, and the rearward end may be supported for pivotal rotation by plate or bracket 68. Supporting brackets 67, 68 may be secured to the tractor frame, and may include bearings to facilitate rotational or pivotal motion of the torque shaft about its longitudinal axis.

Next, one embodiment of rear steering linkage 27 will be described in greater detail. Right rear crank 59 may be positioned on torque shaft 21 at an angle of between about 60 and 180 degrees from left rear crank 58. Left rear tie rod and right rear tie rod may be positioned behind or rearwardly of rear axle 19. Left rear tie rod 61 may be pivotably connected by use of fastener 81 between left rear crank 58 and left rear arm member 76. Right rear tie rod 62 may be pivotably connected by use of fastener 82 between right rear crank 59 and right rear arm member 77. Rear arm members 76, 78 may be pivotable for turning the left and right rear wheels 14, 15. The left and right rear wheels may be supported at the opposing ends of rear axle 19.

In one embodiment, as the steering wheel is turned, the sector gear and sector steering arms pivot, and the front tie rods cause the front wheels to turn. Pivoting the sector gear also causes torque shaft 21 to rotate about its longitudinal axis, so that left and right rear cranks 58, 59 pivot, thereby moving left and right rear tie rods 61, 62 so that the rear wheels also turn simultaneously with the front wheels.

Figure 4:
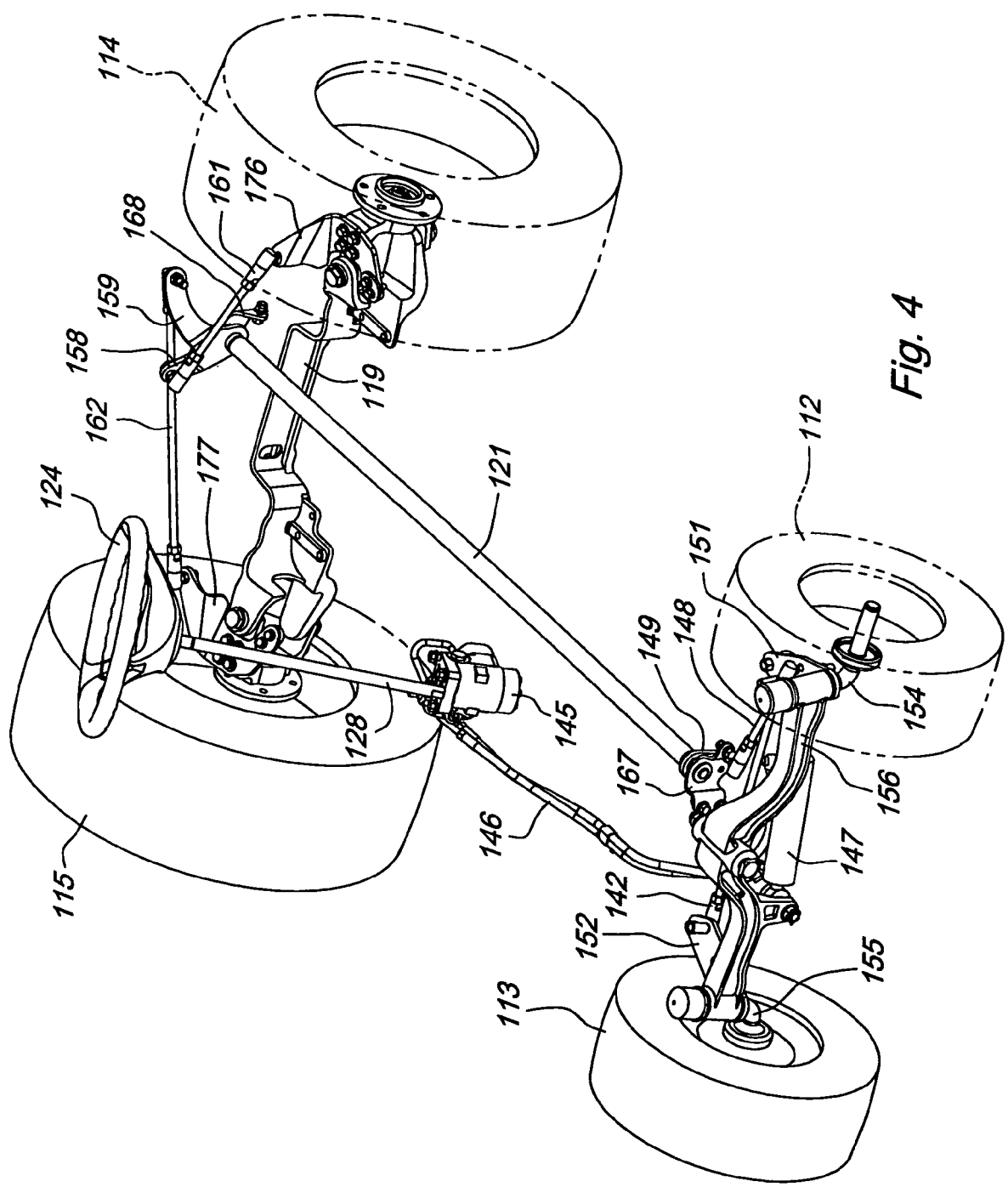
FIG. 4 is a perspective view of the all wheel steering system with torque shaft linkage according to a second embodiment.
Figure 5:
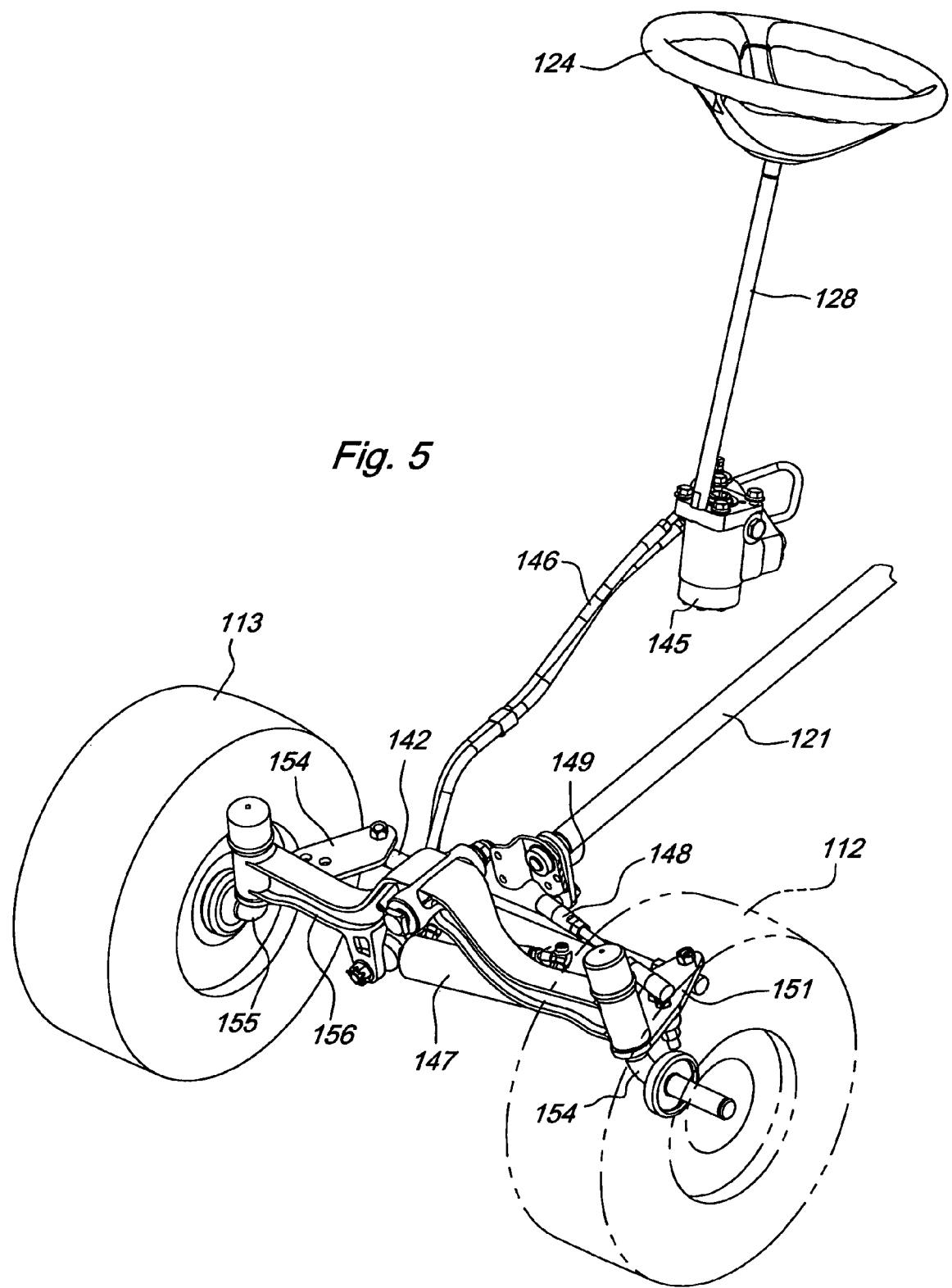
FIG. 5 is a perspective view of the front steering linkage according to the second embodiment.
Figure 6:
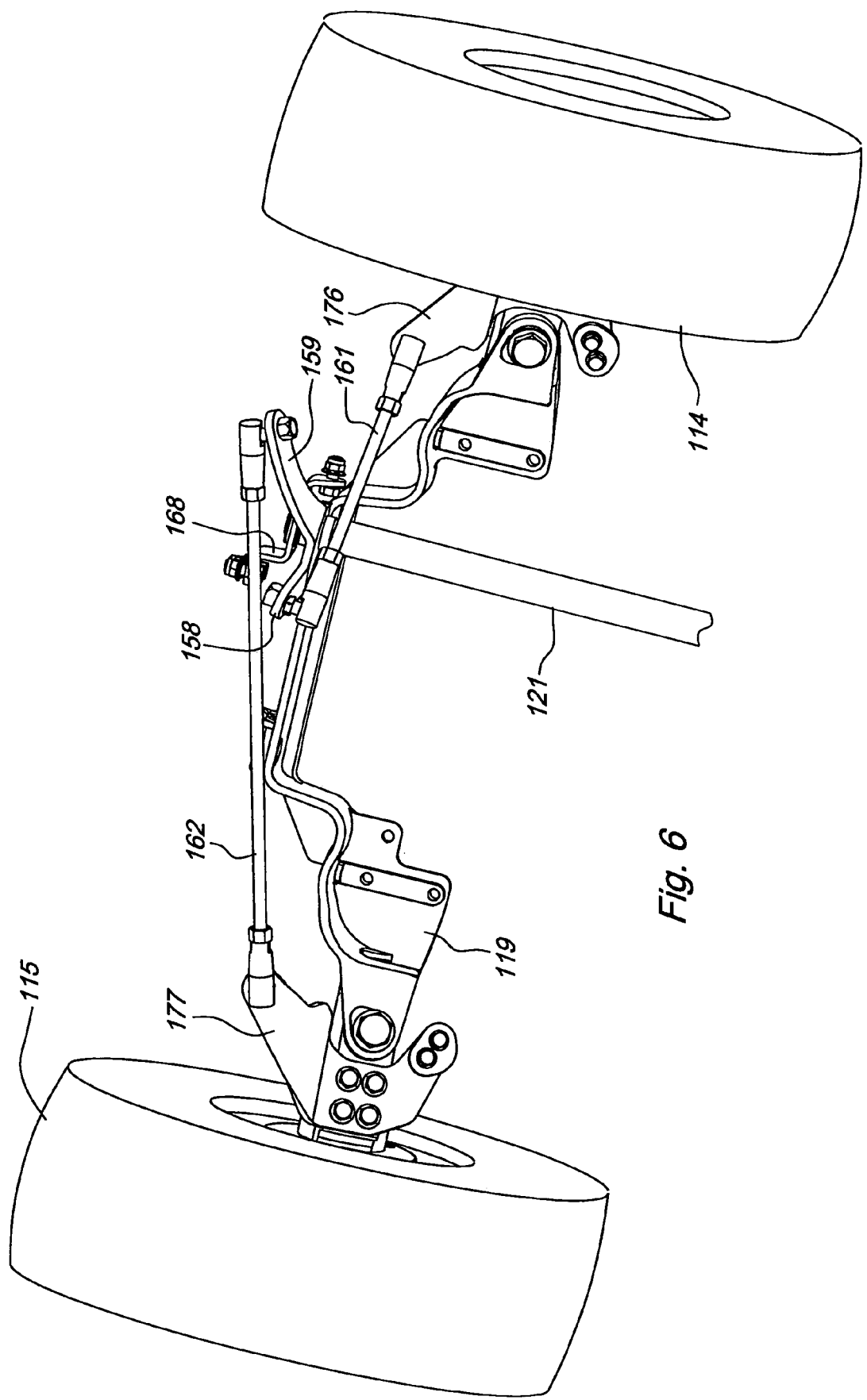
FIG. 6 is a perspective view of the rear steering linkage according the second embodiment.

In a second embodiment shown in FIGS. 4-6, steering shaft 128 may be coupled to and extend downwardly between steering wheel 124 and hydraulic power steering valve 145. The hydraulic steering valve may be connected via hydraulic conduits 146 to cylinder 147. Cylinder 147 houses a piston that extends or retracts from the cylinder to cause front wheels 112, 113 to turn.

In a second embodiment, front tie rod 142 may be pivotably attached between left and right front steering arms 151, 152. Left and right front steering arms 151, 152 may be operatively fixed with left and right front wheel support assemblies or spindles 154, 155 for pivoting the left and right front wheels 112, 113 during execution of a vehicle turn. The front wheel support assemblies or spindles 112, 113 may be mounted to front axle 156.

In a second embodiment, rod 148 may pivotably connect left steering arm 151 to front crank 149. Front crank 149 may be securely fixed by welds or other means at or near the forward end of torque shaft 121. Pivotal movement of front crank 149 causes torque shaft 121 to pivot on its longitudinal axis. As the operator turns steering wheel 124, steering shaft 128 rotates, causing a piston in cylinder 147 to turn front steering arms 151, 152. As a result, front crank 149 causes torque shaft 121 to pivot.

In a second embodiment, crank 149 and torque shaft pivot on an axis parallel to the longitudinal axis of the vehicle. This axis may be defined by torque shaft 121. Front crank 149 may be fixed by welds or other secure attachment means to torque shaft 121 at or near its forward end. Left and right rear cranks 158, 159 also may be fixed by welds of other secure attachment means to torque shaft 121 at or near its rearward end. In the embodiment of FIGS. 4-6, the left and right rear cranks may form an integral one-piece structure that may be welded to the torque shaft at or near its rearward end. The forward end of torque shaft 121 may be supported for pivotal rotation by plate or bracket 167, and the rearward end may be supported for pivotal rotation by plate or bracket 168. Supports 167, 168 may be secured to the tractor frame, and may include bearings to facilitate rotational or pivotal motion of the torque shaft about its longitudinal axis.

In one embodiment, right rear crank 159 may be secured to torque shaft 121 at an angle of between about 60 and 180 degrees with respect to left rear crank 158. Left rear tie rod 161 may be pivotably connected between left rear crank 158 and left rear arm member 176. Right rear tie rod 162 may be pivotably connected between right rear crank 159 and right rear arm member 177. Rear arm members 176, 177 may pivot to turn the left and right rear wheels 114, 115. The left and right rear wheels may be pivotably supported at the opposing ends of rear axle 119.

In one embodiment, the torque shaft linkage of the present invention may function in a smaller space than required by other all wheel steering systems. The torque shaft linkage includes fewer parts than other all wheel steering systems. The torque shaft linkage can better absorb shock loading through elastic strain in torsion. The torque shaft linkage offers a more equal turn radius in both directions, because the torque shaft may pivot either way without restriction.

Having described the preferred embodiment, it will become apparent that various modifications can be made without departing from the scope of the invention as defined in the accompanying claims.

The invention claimed is:

1. An apparatus comprising:
    a front steering linkage of a utility vehicle including a steering shaft operatively connected to a left front arm and a right front arm pivotable to turn a left front wheel and a right front wheel of the vehicle; and a first rod connecting at least one of the left and right front arms to a front crank;
    a rear steering linkage of the utility vehicle including a left rear arm and a right rear arm pivotable to turn a left rear wheel and a right rear wheel of the vehicle; a left rear tie rod and a right rear tie rod pivotably connecting the left and right rear arms to a left rear crank and a right rear crank; and
    a torque shaft having a longitudinal axis, a forward end and a rearward end; the front crank secured to the torque shaft adjacent the forward end, and the left and right rear cranks secured to the torque shaft adjacent the rearward end; the torque shaft pivotable on the longitudinal axis in response to turning the steering shaft.

2. The apparatus of claim 1 further comprising a sector gear pivotable in response to turning the steering shaft.

3. The apparatus of claim 2 further comprising a sector pin attached to the sector gear and having an axis transverse to the longitudinal axis of the torque shaft.

4. The apparatus of claim 3 further comprising a sector pin crank secured to the sector pin; and a rod connecting the sector pin crank to the front crank.

5. The apparatus of claim 1 further comprising a hydraulic power steering valve operatively connected to the steering shaft.

6. The apparatus of claim 1 wherein the front wheels are connected to a front axle and the rear wheels are connected to a rear axle; each axle having a center line; and wherein the torque shaft is positioned above the axle centerlines.

7. A steering linkage between a front pair of steerable wheels and a rear pair of steerable wheels of a utility vehicle, comprising:
   a torque shaft having a longitudinal axis with a forward end adjacent the front pair of steerable wheels and a rearward end adjacent the rear pair of steerable wheels; and
   a front crank attached to the torque shaft adjacent the forward end; and left and right rear cranks attached to the torque shaft adjacent the rearward end; the front crank pivotable to turn the torque shaft on its longitudinal axis and turn the left and right rear cranks linked to the rear pair of steerable wheels; and
   a sector pin having a sector pin crank attached thereto, and a rod between the front crank and the sector pin crank.

8. The steering linkage of claim 7 further comprising a pair of tie rods between the left and right rear cranks and the rear pair of steerable wheels.

9. The steering linkage of claim 7 further comprising a steering shaft linked to the front pair of steerable wheels.

10. The steering linkage of claim 7 further comprising a sector pin having a sector pin crank attached thereto, and a rod between the front crank and the sector pin crank.

11. An apparatus comprising:
   a utility vehicle having a steering wheel;
   the steering wheel attached to a steering shaft linked to a front pair of pivotable steering arms connected to a pair of front wheels;
   a front crank linked to the front pair of pivotable steering arms;
   a pair of rear tie rods extending between a left rear crank and a right rear crank and a rear pair of pivotable steering arms connected to a pair of rear wheels;
   a torque shaft having a forward end and a rearward end, the front crank secured to the torque shaft adjacent the forward end, and the left rear and right rear cranks secured to the torque shaft adjacent the rearward end, the torque shaft transmitting rotation between the front crank to the left and right rear cranks when the steering wheel is turned to simultaneously steer the pairs of front and rear wheels.

12. The apparatus of claim 11 further comprising a hydraulic cylinder between the steering shaft and the front pair of pivotable steering arms.

13. The apparatus of claim 11 wherein the steering shaft includes a pinion gear engaged to a sector gear.

14. The apparatus of claim 13 further comprising a sector pin having an axis transverse to the torque shaft axis.

15. The apparatus of claim 14 further comprising a sector pin crank secured to the sector pin.

16. The apparatus of claim 15 further comprising a rod between the front crank and the sector pin crank.

17. The apparatus of claim 11 wherein the left rear crank and right rear crank are separated in position on the torque shaft by between about 60 degrees and about 180 degrees.

18. The apparatus of claim 11 further comprising a front axle and a rear axle.

19. The apparatus of claim 18 wherein the pair of rear tie rods are positioned rearward of the rear axle.

\* \* \* \* \*